United States Patent
Yoo et al.

(10) Patent No.: US 10,776,896 B2
(45) Date of Patent: Sep. 15, 2020

(54) GRAPHICS PROCESSING UNIT THAT PERFORMS PATH RENDERING, AND A METHOD OF OPERATING THE SAME

(71) Applicant: Samsung Electronics Co., Ltd., Suwon-si (KR)

(72) Inventors: Jeong-joon Yoo, Hwaseong-si (KR); Taek-hyun Kim, Seongnam-si (KR); Dong-hoon Yoo, Suwon-si (KR)

(73) Assignee: SAMSUNG ELECTRONICS CO., LTD., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 6 days.

(21) Appl. No.: 16/007,628

(22) Filed: Jun. 13, 2018

(65) Prior Publication Data

US 2019/0080428 A1 Mar. 14, 2019

(30) Foreign Application Priority Data

Sep. 12, 2017 (KR) .................. 10-2017-0116658

(51) Int. Cl.
*G06T 1/20* (2006.01)
*G06T 1/60* (2006.01)
*G06T 11/40* (2006.01)
*G06T 11/20* (2006.01)

(52) U.S. Cl.
CPC .............. *G06T 1/20* (2013.01); *G06T 1/60* (2013.01); *G06T 11/203* (2013.01); *G06T 11/40* (2013.01)

(58) Field of Classification Search
CPC ......... G06T 1/20; G06T 11/203; G06T 11/40; G06T 1/60; G06T 2210/12
See application file for complete search history.

(56) References Cited

U.S. PATENT DOCUMENTS

| | | | |
|---|---|---|---|
| 7,408,553 B1* | 8/2008 | Toksvig | G06T 11/40 345/423 |
| 7,817,512 B1 | 10/2010 | Oberg et al. | |
| 7,817,514 B2 | 10/2010 | Suh et al. | |
| 7,872,648 B2 | 1/2011 | Hoppe et al. | |
| 9,311,738 B2 | 4/2016 | Kilgard | |

(Continued)

FOREIGN PATENT DOCUMENTS

KR 10-2015-0122519 11/2015

OTHER PUBLICATIONS

Yoo, et al., Path Rendering for High Resolution Mobile Device, Proceeding SA '14 SIGGRAPH Asia 2014, Mobile Graphics and Interactive Applications, Article No. 13, Shenzhen, China, Dec. 3-6, 2014, ACM, New York, NY, USA 2014. (Year: 2014).*

(Continued)

*Primary Examiner* — Maurice L. McDowell, Jr.
*Assistant Examiner* — Donna J. Ricks
(74) *Attorney, Agent, or Firm* — Muir Patent Law, PLLC

(57) ABSTRACT

Provided are a graphics processing unit and a graphics processing method for performing path rendering. The graphics processing method may include receiving object information including primitive information regarding the object; generating a primitive mask with respect to respective pixels, the primitive mask corresponding to the primitive information and including a plurality of bits; generating, based on the primitive mask, winding numbers with respect to the respective pixels; and rendering the pixels, based on the winding numbers.

17 Claims, 14 Drawing Sheets

(56) References Cited

U.S. PATENT DOCUMENTS

| | | | |
|---|---|---|---|
| 9,330,495 B2 | 5/2016 | Goel et al. | |
| 9,437,014 B2 | 9/2016 | Perry et al. | |
| 2005/0057564 A1* | 3/2005 | Liao | G06T 15/005 |
| | | | 345/422 |
| 2014/0043342 A1* | 2/2014 | Goel | G06T 9/00 |
| | | | 345/501 |
| 2014/0168222 A1* | 6/2014 | Bolz | G06T 11/40 |
| | | | 345/441 |
| 2015/0310636 A1 | 10/2015 | Yoo et al. | |
| 2016/0042561 A1 | 2/2016 | Yoo et al. | |
| 2016/0196678 A1 | 7/2016 | Yoshimura | |
| 2017/0039743 A1 | 2/2017 | Yoo et al. | |

OTHER PUBLICATIONS

Yoo, et al., Path Rendering Using Winding Number Generator, 2015 IEEE International Conference on Consumer Electronics (ICCE), Jan. 9-12, 2015, IEEE Xplore: Mar. 26, 2015 (Year: 2015).*
First Office Action from the GB Intellectual Property Office in corresponding application GB 1810476.0, dated Dec. 5, 2018.

* cited by examiner

| Pixel | RP | PM | WN Calculation | Cache Operation |
|---|---|---|---|---|
| P1 | V2 | '00010' | +1 | Save |
| P2 | V2 | '00010' |  | Read |
| P3 | V2, V5 | '10010' | +2 | Save |
| P4 | V2, V5 | '10010' |  | Read |
| P5 | V2, V3, V5 | '10110' | +1 | Save |
| P6 | V2, V3, V5 | '10110' |  | Read |

(a)                (b)

GRAPHICS PROCESSING UNIT THAT PERFORMS PATH RENDERING, AND A METHOD OF OPERATING THE SAME

CROSS-REFERENCE TO RELATED APPLICATION

This application claims the benefit of Korean Patent Application No. 10-2017-0116658, filed on Sep. 12, 2017, in the Korean Intellectual Property Office, the disclosure of which is incorporated herein in its entirety by reference.

BACKGROUND

The present disclosure relates to a graphics processing unit, and more particularly, to a graphics processing unit that performs path rendering, and a method of operating the same.

Recently, as display resolution has become higher and display graphics become more complex, research has been carried out on techniques for improving acceleration performance of hardware such as a graphics processing unit when performing vector graphics or path rendering. For path rendering, a technique for calculating winding numbers corresponding to respective pixels and performing rendering has been introduced. However, since this method includes calculating winding numbers for respective pixels, the overall rendering time with respect to all pixels increases. Thus, a faster rendering method is described herein.

SUMMARY

The present disclosure provides a graphics processing unit capable of efficiently performing rendering by reducing an amount of winding number calculation.

The present disclosure also provides a method of operating a graphics processing unit capable of efficiently performing rendering by reducing an amount of winding number calculation.

According to an aspect of the inventive concept, there is provided a graphics processing method of rendering an object, the graphics processing method including receiving, by one or more processors, object information including primitive information regarding the object; generating, by the one or more processors, a primitive mask with respect to respective pixels, the primitive mask corresponding to the primitive information and including a plurality of bits; generating, by the one or more processors, and based on the primitive mask, winding numbers with respect to the respective pixels; and rendering the pixels, based on the winding numbers.

According to another aspect of the inventive concept, there is provided a graphics processing unit, which generates winding numbers in different manners depending on primitive information, the graphics processing unit including a winding number generator configured to receive object information including primitive information regarding an object, the winding number generator including a first memory for storing a winding number corresponding to the primitive information; and a rendering determiner configured to perform rendering based on the winding number, wherein the winding number generator generates winding numbers respectively corresponding to a plurality of pixels in different manners based on a determination of whether the winding number corresponding to the primitive information is stored in the first memory.

According to another aspect of the inventive concept, there is provided a graphics processing unit including a winding number manager configured to generate, based on primitive information, a primitive mask including a plurality of bits; and a first memory configured to store the primitive mask and a winding number corresponding the primitive mask, wherein the winding number manager is configured to write or read a winding number corresponding to the primitive information to and from the first memory in response to reception of the primitive information.

BRIEF DESCRIPTION OF THE DRAWINGS

Embodiments of the inventive concept will be more clearly understood from the following detailed description taken in conjunction with the accompanying drawings in which.

DETAILED DESCRIPTION

Figure 1:
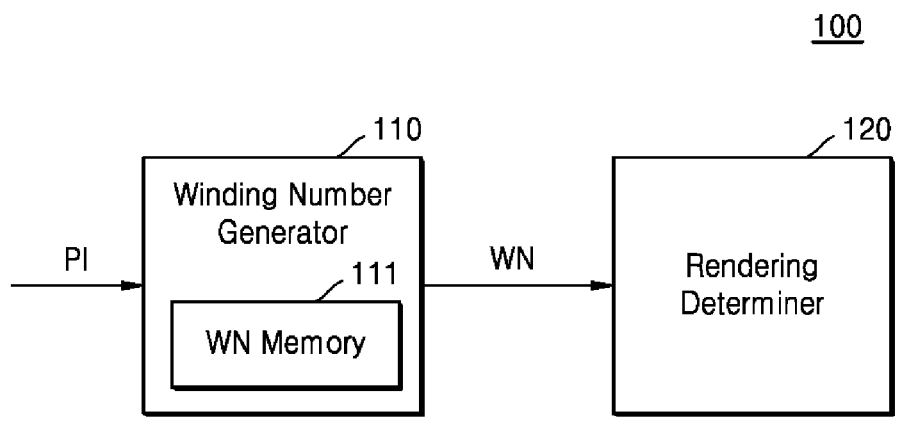
FIG. 1 is a block diagram showing a graphics processing unit according to an example embodiment.

FIG. 1 is a block diagram showing a graphics processing unit (GPU) according to an example embodiment.

Referring to FIG. 1, a graphics processing unit 100, which may be in the form of a circuit, chip, or processor, may include a winding number generator 110 and a rendering determiner 120. The various components used for generating, analyzing, comparing, and/or calculating values, such as the winding number generator 110, rendering determiner 120 and other components described in this application, may include any suitable means capable of performing the operations, such as various hardware and/or software component(s), circuits, and/or module(s). The software may comprise an ordered listing of executable instructions for implementing logical functions, and can be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware (e.g., hardware of a GPU), in a software module executed by a processor (e.g., software executed by a GPU), or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

The winding number generator 110 may receive primitive information PI. According to an example embodiment, primitive information PI may be received from a central processing unit (CPU), and the CPU may generate primitive information PI using object information including information regarding vertices included in an object to be rendered. An object may include at least one primitive to be rendered and may include a closed polygon or a closed path formed by connecting at least one primitive. Here, a primitive may refer to a straight line or a curved line extending from one point to another. The object information may include information regarding coordinates of vertices and commands for configuring a primitive by combining the vertices. Here, the vertices may include a vertex corresponding to a start position of a primitive or a vertex corresponding to an end position of the primitive.

For example, when it is assumed that a straight line from a first pixel of an image to a second pixel from among pixels included in a frame is a primitive, vertices may refer to points respectively corresponding to the first pixel and the second pixel in the frame. Therefore, object information may include a coordinate of a first vertex corresponding to the first pixel, a coordinate of a second vertex corresponding to the second pixel, and a command instructing to configure a straight line from the first vertex to the second vertex. Therefore, by referring to the object information, not only information regarding the coordinates of the vertices constituting the primitive, but also information regarding a direction of the primitive may be obtained. Furthermore, the object information may include information regarding color values to be set to respective pixels.

The winding number generator 110 may further receive color assignment rule information, sample location information, and color information from the CPU, and the color assignment rule information, primitive information PI, the sample location information, and the color information may constitute geometry data regarding a pixel. The sample location information may include information regarding a location of pixels corresponding to the object information, and the color information may include information regarding colors to be assigned to the pixels. The color assignment rule information may include a rule for assigning the colors to the pixels according to winding numbers WNs, and the primitive information PI may include information regarding a primitive extending in one direction at the position of a corresponding pixel.

The winding number generator 110 may generate a winding number WN based on the received primitive information PI and output the winding number WN to the rendering determiner 120. According to an example embodiment, the winding number generator 110 may generate information regarding a right primitive based on the primitive information PI and generate a winding number WN based on the right primitive. According to another example embodiment, the primitive information PI may include information regarding a right primitive, and the winding number generator 110 may generate a winding number WN based on the information regarding the right primitive. The right primitive may include information regarding a primitive existing on an imaginary line located on the right side of each pixel and is referred to as a right primitive throughout the present specification, but the inventive concept is not limited thereto. The right primitive will be described below in detail with reference to FIGS. 5 and 8. According to an example embodiment of the inventive concept, the winding number generator 110 may include a winding number memory 111 (e.g., memory cells that store one or more winding numbers) and may reduce an amount of a winding number WN calculation by utilizing the winding number memory 111.

The winding number memory 111 is a memory for storing a winding number WN corresponding to the primitive information PI. For example, the winding number memory 111 may include a volatile memory, such as a static random access memory (SRAM), a dynamic random access memory (DRAM), a latch, a flip-flop, and a register, or a non-volatile memory, such as a NAND flash memory, a vertical NAND (VNAND) flash memory, a NOR flash memory, a resistive random access memory (RRAM), a phase-change random access memory (PRAM), a magnetoresistive random access memory (MRAM), a ferroelectric random access memory (FRAM), and a spin transfer torque random access memory (STT-RAM). Hereinafter, it will be described that the winding number memory 111 is a cache memory, but it should be understood that the inventive concept is not limited thereto.

The winding number generator 110 may check whether a winding number WN corresponding to a right primitive is stored in the winding number memory 111 based on received primitive information PI. When a winding number WN corresponding to the right primitive is stored in the winding number memory 111, the winding number generator 110 may read the winding number WN corresponding to the right primitive from the winding number memory 111 without calculating the winding number WN. As a result, an amount of a calculation for the winding number WN may be reduced.

When a winding number WN corresponding to the right primitive is not stored in the winding number memory 111, the winding number generator 110 may calculate winding numbers WNs respectively corresponding to pixels included in a frame based on relationships between locations of the respective pixels and an extending direction of at least one vertex interconnecting vertices.

Here, a winding number WN may refer to a pre-set value N indicating the number of times that a primitive is rotated while the primitive is being drawn when laterally viewed from a location of a particular pixel. A winding number WN may be calculated by increasing the pre-set number N when the primitive is rotating in the clockwise direction and decreasing the pre-set number N when the primitive is rotating in the counterclockwise direction. However, the inventive concept is not limited thereto. For example, when a primitive is rotated once in the clockwise direction, the winding number WN of a pixel may be +1. On the contrary, when the primitive is rotated once in the counterclockwise direction, the winding number WN of the pixel may be −1. In another example, when a primitive is rotated once in the clockwise direction, the winding number WN of a pixel may be −1. On the contrary, when the primitive is rotated once in the counterclockwise direction, the winding number WN of the pixel may be +1.

Furthermore, the pre-set value N may be an integer, but is not limited thereto. In other words, the winding number WN may be unlimitedly any of numbers mapped to the number of times that a primitive is rotated while the primitive is being drawn when laterally viewed from a location of a particular pixel. For example, when a primitive is rotated once in the clockwise direction, a winding number WN of a pixel may be +0.1. On the contrary, when the primitive rotates once in the counterclockwise direction, the winding number WN of the pixel may be −0.1. in another example, when a primitive is rotated once in the clockwise direction, a winding number WN of a pixel may be −0.5. On the contrary, when the primitive rotates once in the counterclockwise direction, the winding number WN of the pixel may be +0.5.

The winding number generator 110 may output a winding number WN generated as described above to the rendering determiner 120. The rendering determiner 120 may determine whether to assign a color to a corresponding pixel based on the winding number WN. According to an example embodiment, the rendering determiner 120 may further receive information regarding a color assignment rule and may determine whether to assign a color to a corresponding pixel based on the color assignment rule and a winding number WN. According to an example embodiment, the rendering determiner 120 may further receive color information from the winding number generator 110 and render the pixel to a color corresponding to the received color information. For example, the rendering determiner 120 may be implemented in hardware (e.g., an integrated circuit) and/or software.

Figure 2:
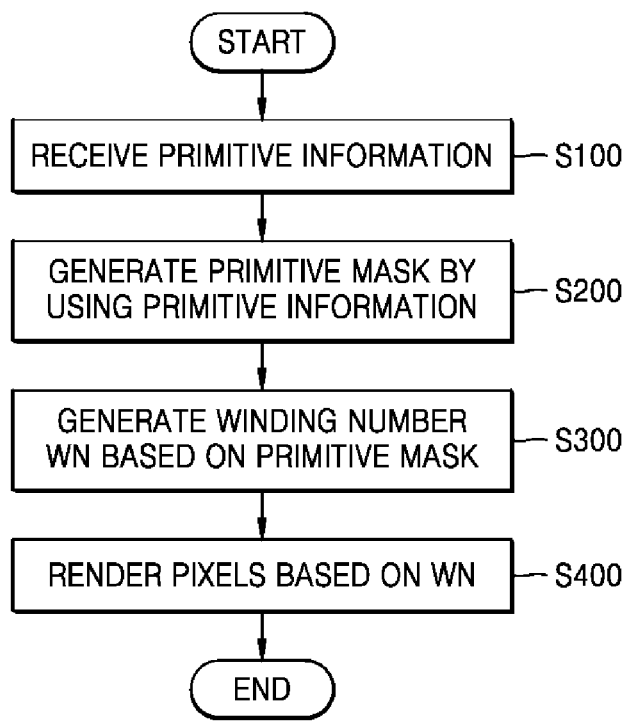
FIG. 2 is a flowchart of a method of operating a graphics processing unit, according to an example embodiment.

FIG. 2 is a flowchart of a method of operating a graphics processing unit according to an example embodiment.

Referring to FIGS. 1 and 2, the graphics processing unit 100 may receive primitive information PI (operation S100). The graphics processing unit 100 may generate a primitive mask by using the primitive information PI (operation S200). The primitive mask is data consisting of a plurality of bits, which may correspond to a right primitive per pixel. The graphics processing unit 100 may generate a winding number WN based on the primitive mask (operation S300). A method by which the graphics processing unit 100 generates a winding number WN may vary depending on whether the winding number WN corresponding to the primitive mask is stored in the winding number memory 111. Detailed description thereof will be given below with reference to FIGS. 3, 4A, and 4B. The graphics processing unit 100 may render pixels based on the generated winding number WN (operation S400).

Figure 3:
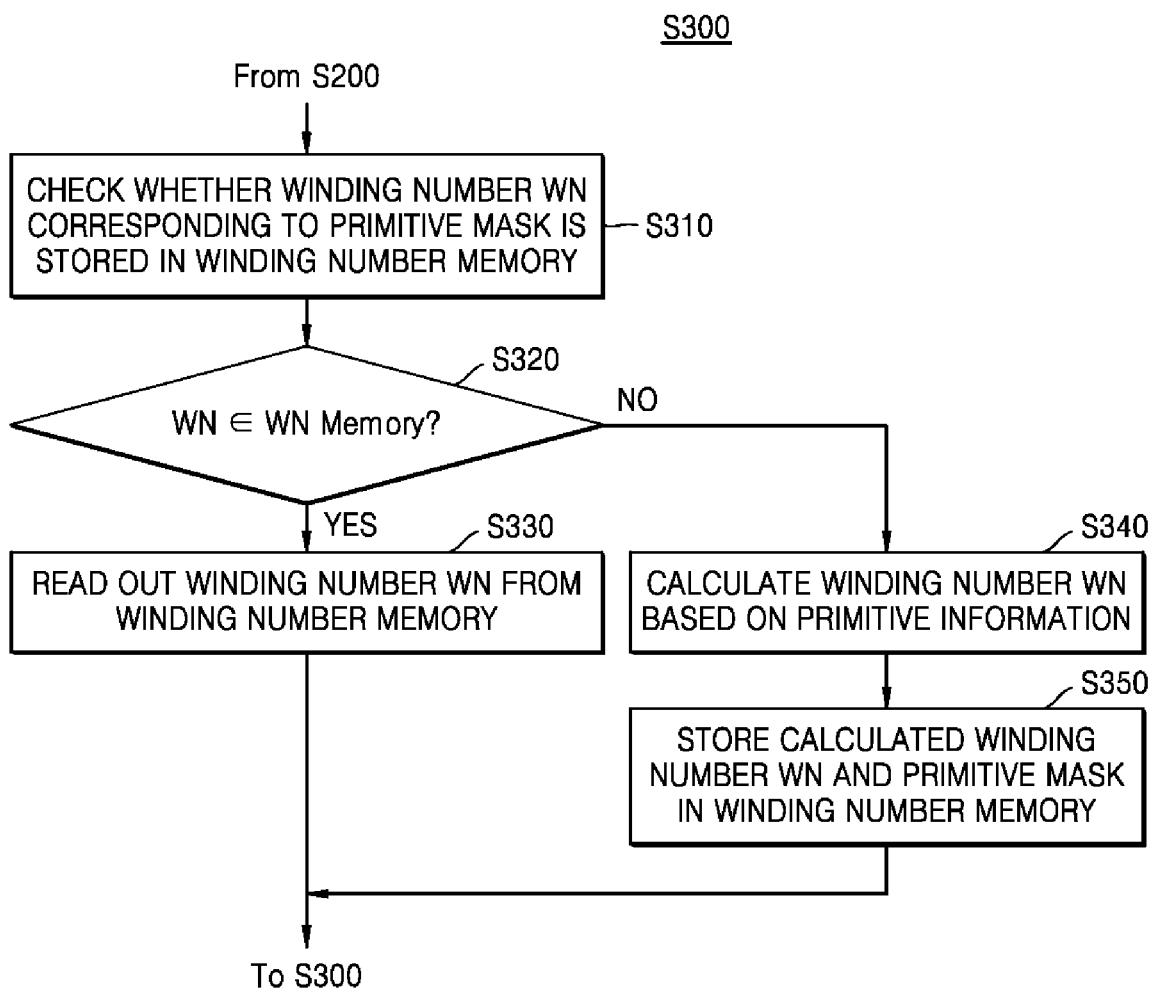
FIG. 3 is a flowchart regarding an operation for generating a winding number WN of FIG. 2, according to an example embodiment.

FIG. 3 is a flowchart regarding the operation S300 for generating a winding number WN of FIG. 2 according to an example embodiment.

Referring to FIGS. 1 and 3, the graphics processing unit 100 may check whether a winding number WN corresponding to a primitive mask is stored in a winding number memory 111 (operation S310). For example, the graphics processing unit 100 may output an address corresponding to a primitive mask to the winding number memory 111 to read a winding number WN and, when the winding number memory 111 outputs a winding number WN in response thereto, the graphics processing unit 100 may determine that the winding number WN is stored in the winding number memory 111. On the contrary, when the winding number memory 111 does not output a winding number WN corresponding to a primitive mask or outputs a message indicating that no data is stored (e.g., 'NULL'), the graphics processing unit 100 may determine that a winding number WN corresponding to the primitive mask is not stored in the winding number memory 111.

When the winding number WN corresponding to the primitive mask is stored in the winding number memory 111 (operation S320), the graphics processing unit 100 may generate a winding number WN by reading the winding number WN from the winding number memory 111 (operation S330).

When the winding number WN corresponding to the primitive mask is not stored in the winding number memory 111 (operation S320), the graphics processing unit 100 may generate a winding number WN by calculating the winding number WN based on primitive information PI (operation S340). The graphics processing unit 100 may store the primitive mask and the calculated winding number WN in the winding number memory 111 so as to correspond each other.

Figure 4A:
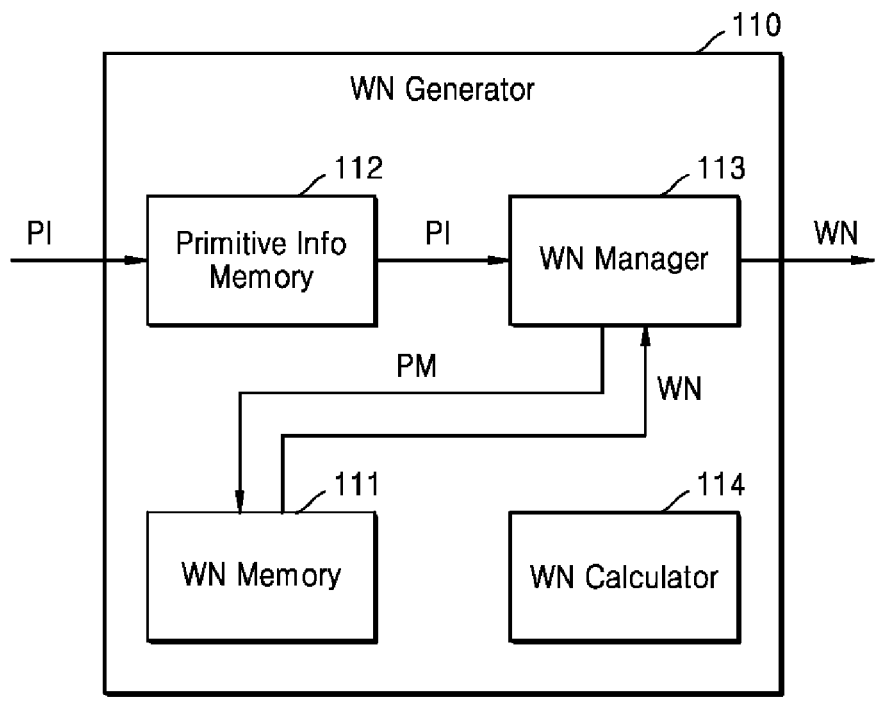
FIG. 4A is a block diagram of a winding number generator according to an example embodiment.

FIG. 4A is a block diagram of a winding number generator according to an example embodiment. The winding number generator may include hardware and/or software to implement the various features discussed below. In detail, FIG. 4A is a block diagram showing an operation of the winding number generator 110 when a winding number WN corresponding to a primitive mask is stored in the winding number memory 111.

Referring to FIGS. 1 and 4A, the winding number generator 110 may include the winding number memory 111, a primitive information memory 112, a winding number manager 113, and a winding number calculator 114. The winding number memory 111 is described above with reference to FIG. 1, and thus detailed description thereof will be omitted.

The primitive information memory 112 is a memory for storing primitive information PI received from the CPU. The primitive information memory 112 may include a volatile memory, such as a static random access memory (SRAM), a dynamic random access memory (DRAM), a latch, a flip-flop, and a register, or a non-volatile memory, such as a NAND flash memory, a vertical NAND (VNAND) flash memory, a NOR flash memory, a resistive random access memory (RRAM), a phase-change random access memory (PRAM), a magnetoresistive random access memory (MRAM), a ferroelectric random access memory (FRAM), and a spin transfer torque random access memory (STT-RAM). Hereinafter, it will be described that the primitive information memory 112 is a cache memory, but it should be understood that the inventive concept is not limited thereto.

The winding number manager 113, which may be implemented on an integrated circuit and may further be implemented using computer programmable code, may read stored primitive information PI and generate a primitive mask PM based on the read primitive information PI. By referring to the primitive information PI, the winding number manager 113 may set a bit corresponding to a primitive extending in a direction from a particular pixel position to '1' and set a bit corresponding to a primitive not extending in the direction to '0', thereby generating the primitive mask PM. According to another example embodiment, the winding number manager 113 may set a bit corresponding to a primitive extending in a direction from a particular pixel position to '0' and set a bit corresponding to a primitive not extending in the direction to '1', thereby generating the primitive mask PM. Detailed description thereof will be given below with reference to FIG. 6.

The winding number manager 113 may check whether a winding number WN corresponding to the primitive mask PM generated according to the method described above is stored in the winding number memory 111. For example, the winding number manager 113 may output an address corresponding to the primitive mask PM to the winding number memory 111, and the winding number memory 111 may output a winding number WN to the winding number manager 113. The winding number manager 113 may output the winding number WN generated according to the method described above to the rendering determiner 120.

Figure 4B:
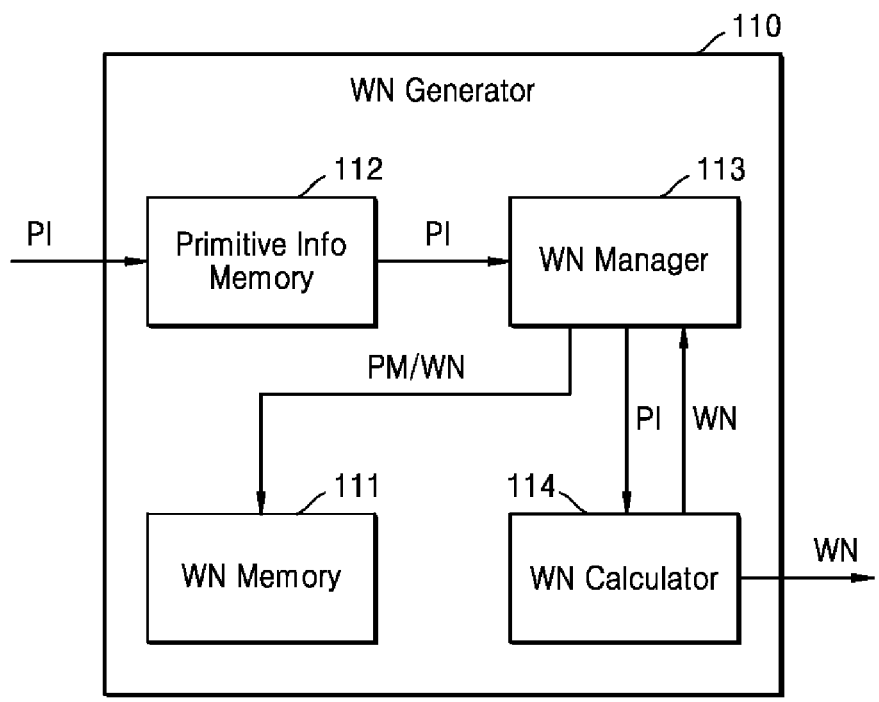
FIG. 4B is a block diagram of a winding number generator according to an example embodiment.

FIG. 4B is a block diagram of a winding number generator according to an example embodiment. In detail, FIG. 4B is a block diagram showing an operation of the winding number generator 110 when a winding number WN is not stored in the winding number memory 111.

Referring to FIGS. 1 and 4B, the winding number generator 110 may include the winding number memory 111, the primitive information memory 112, the winding number manager 113, and the winding number calculator 114. Since the winding number memory 111, the primitive information memory 112, and the winding number manager 113 are described above with reference to FIG. 4A, detailed description thereof will be omitted.

The winding number manager 113 may generate a primitive mask PM based on primitive information PI and check whether a winding number WN corresponding to the generated primitive mask PM is stored in the winding number memory 111. When the winding number WN is not stored in the winding number memory 111, the winding number manager 113 may output the primitive information PI to the winding number calculator 114. The winding number calculator 114 may calculate a winding number WN in the manner described above and output the generated winding number WN to the winding number manager 113 and the rendering determiner 120. The winding number manager 113 may store the generated winding number WN and the primitive mask PM in the winding number memory 111 so as to correspond to each other. The calculation and generation, and other calculations and generations described herein, may be performed, for example by hardware or hardware and computer program code of one or more processors (e.g., a GPU and/or CPU).

Figure 5:
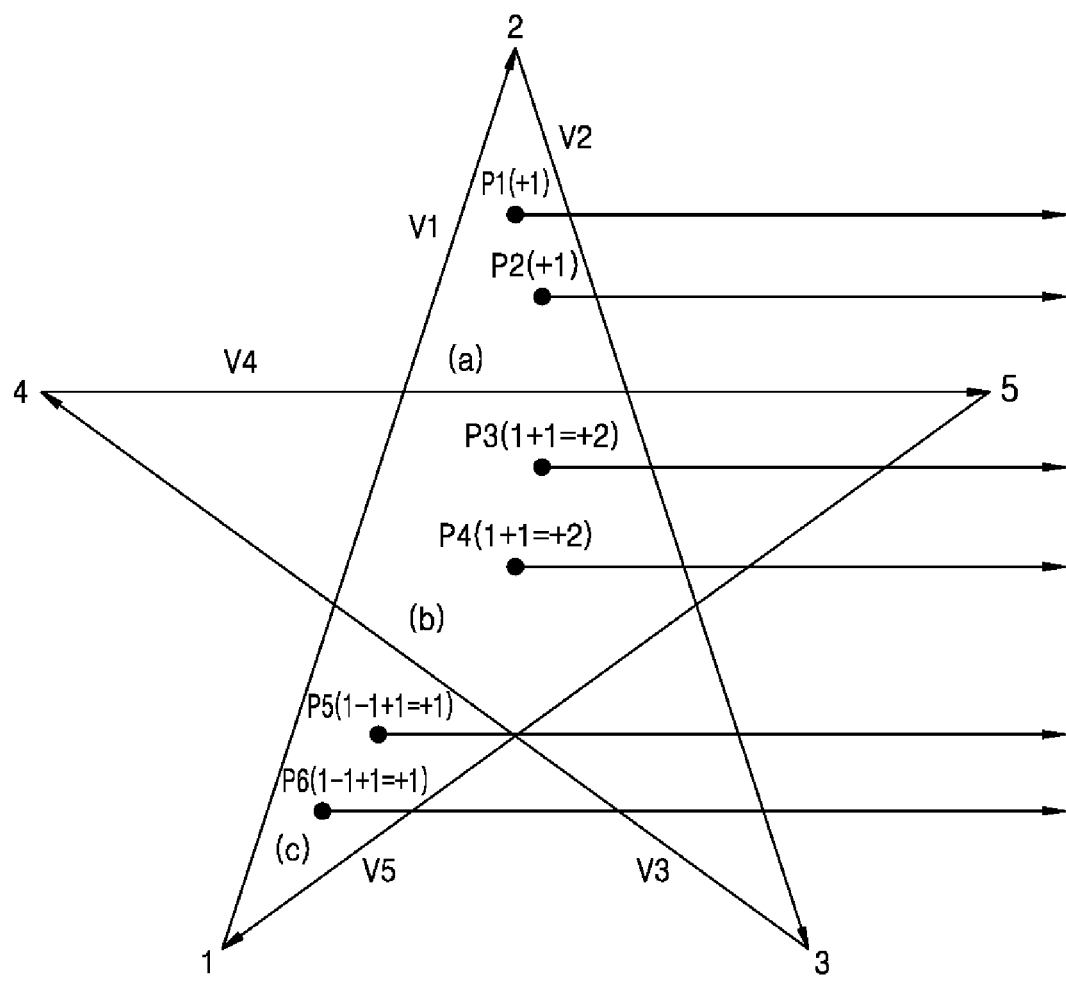
FIG. 5 is a diagram for describing winding numbers, according to an example embodiment.

FIG. 5 is a diagram for describing a winding number WN according to an example embodiment.

FIG. 5 shows an embodiment for showing a winding number WN corresponding to first through sixth pixels P1 through P6 included in a frame. First through fifth primitives V1 through V5 are shown around the first through sixth pixels P1 through P6, and the first through fifth primitives V1 through V5 may constitute a single closed path. Although FIG. 5 shows that winding numbers WNs of the first through sixth pixels P1 through P6 are calculated by using primitives located on the right side of the first through sixth pixels P1 through P6, it is merely an example, and the inventive concept is not limited thereto. Furthermore, the right primitives of the first through sixth pixels P1 through P6 may refer to primitives that meet imaginary semi-straight lines drawn rightward from the first through sixth pixels P1 through P6.

When an imaginary semi-straight line is horizontally drawn rightward from a first pixel P1, the imaginary semi-straight line may meet a second primitive V2. The second primitive V2 may extend in a clockwise direction from the first pixel P1 at the intersection at which the imaginary semi-straight line meets the second primitive V2. Therefore, a winding number WN corresponding to the first pixel P1 may be calculated as '+1'. In the same regard, the second primitive V2 may extend in a clockwise direction from a second pixel P2 at the intersection at which an imaginary semi-straight line drawn from the second pixel P2 meets the second primitive V2, and a winding number WN corresponding to the second pixel P2 may also be calculated as '+1'.

When an imaginary semi-straight line is horizontally drawn rightward from a third pixel P3, the imaginary semi-straight line may meet the second primitive V2 and a fifth primitive V5. The second primitive mask V2 may extend in a clockwise direction from the third pixel P3 at the intersection at which the imaginary semi-straight line meets the second primitive V2, and the fifth primitive V5 may extend in a clockwise direction from the third pixel P3 at the intersection at which the imaginary semi-straight line meets the fifth primitive V5. Therefore, a winding number WN corresponding to the third pixel P3 may be calculated as '1+1=2', Similarly, in case of a fourth pixel P4, since primitives met by an imaginary semi-straight line horizontally extending rightward from the fourth pixel P4 and directions in which the primitives extend at intersections are identical to those in the case of the third pixel P3, a winding number WN corresponding to the fourth pixel P4 may also be calculated as '1+1=2'.

When an imaginary semi-straight line is horizontally drawn rightward from the fifth pixel P5, the imaginary semi-straight line may meet the second primitive V2, a third primitive V3, and the fifth primitive V5. A direction in which the second primitive V2 extends at the intersection where the imaginary semi-straight line meets the second primitive V2 may be a clockwise direction from the fifth pixel P5, a direction in which the third primitive V3 extends at the intersection at which the imaginary semi-straight line meets the third primitive V3 may be a counterclockwise direction from the fifth pixel P5, and a direction in which the fifth primitive V5 extends at the intersection at which the imaginary semi-straight line meets the fifth primitive V5 may be a clockwise direction from the fifth pixel P5. Therefore, a winding number WN corresponding to the fifth pixel P5 may be calculated as '1−1+1=+1'. Similarly, in case of a sixth pixel P6, since primitives met by an imaginary semi-straight line horizontally extending rightward from the sixth pixel P6 and directions in which the primitives extend at intersections are identical to those in the case of the fifth pixel P5, a winding number WN corresponding to the sixth pixel P6 may also be calculated as '1−1+1=+1'.

Since primitives met by imaginary semi-straight lines horizontally extending rightward from all pixels included in a first region (a) and directions in which the primitives extend at intersections are the same, winding numbers WNs corresponding to all of the pixels included in the first region (a) may be identical to one another, or '+1'. Furthermore, similarly, primitives met by imaginary semi-straight lines horizontally extending rightward from all pixels included in a second region (b) and directions in which the primitives extend at intersections are same, winding numbers WNs corresponding to all of the pixels included in the second region (b) may be identical to one another, or '+2'. In the same regard, winding numbers WNs corresponding to all of pixels included in a third region (c) may be identical to one another, or '+1'.

Pixels having a same right primitive may have a same winding number WN. Therefore, according to the disclosed embodiments, a result of calculation of a winding number WN regarding any one pixel may be utilized with respect to pixels having a right primitive identical to that of the pixel.

According to an example embodiment, a winding number generator (110 in FIG. 1) may generate a right primitive based on primitive information PI. According to another example embodiment, the winding number generator (110 in FIG. 1) may receive a right primitive from an external unit (e.g., CPU) as primitive information PI.

Figures 6, 7:
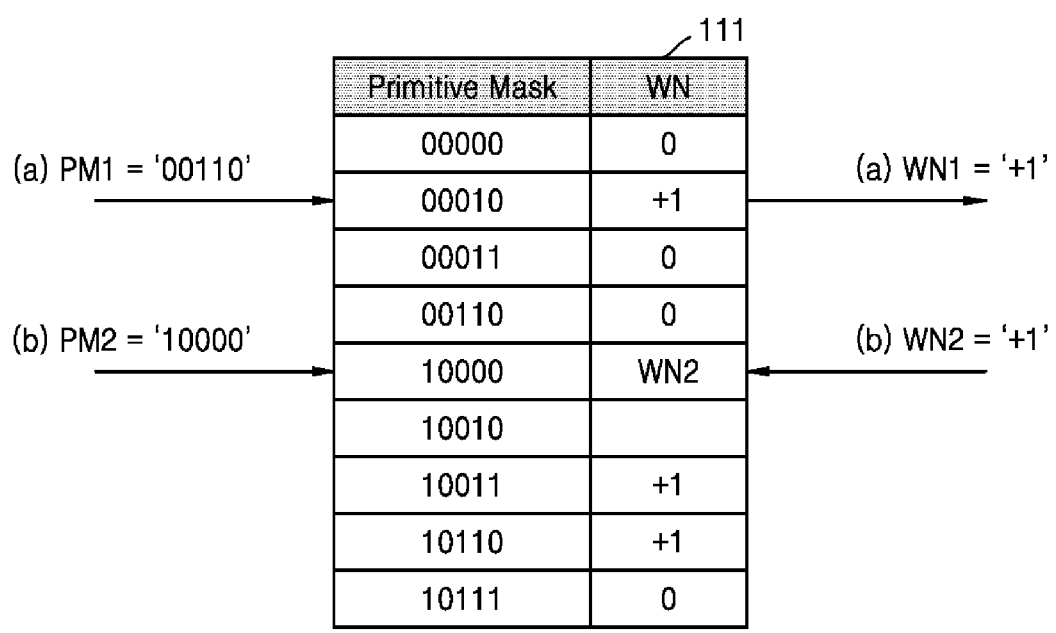
FIG. 6 is a table for describing an operation of a winding number generator, according to an example embodiment.
FIG. 7 is a table for describing an operation of a winding number generator, according to an example embodiment.

FIG. 6 is a table for describing an operation of a winding number generator according to an example embodiment.

Referring to FIGS. 1, 5, and 6, both the first pixel P1 and the second pixel P2 may have the second primitive V2 as a right primitive RP. According to an example embodiment, the winding number generator 110 may determine the second primitive V2 as the right primitive RP for the first pixel P1 and the second pixel P2 based on primitive information PI. According to another example embodiment, the winding number generator 110 may receive the right primitive RP from an external unit (e.g., CPU). The winding number generator 110 may generate a primitive mask PM based on the right primitive RP. For example, locations of the primitive mask PM may correspond to respective primitives, where the winding number generator 110 may set only the primitive mask PM corresponding to the first pixel P1 and the second pixel P2 having the second primitive V2 as the right primitive RP, such that a second digit of the primitive mask PM from the right is '1' and the remaining digits are '0'. As a result, the primitive mask PM corresponding to the first pixel P1 and the second pixel P2 may be set to '00010'.

For example, the winding number generator 110 may receive primitive information PI regarding the first pixel P1, and the winding number generator 110 may confirm that a winding number WN corresponding to the primitive mask PM of the first pixel P1, which is '00010', is not stored in the winding number memory 111. Therefore, the winding number generator 110 may calculate the winding number WN corresponding to the first pixel P1 to '+1' and store the calculated winding number WN and the primitive mask PM in the winding number memory 111 (e.g., save the calculated winding number WN to a cache) so that the calculated winding number WN and the primitive mask PM correspond to each other.

Next, the winding number generator 110 may receive primitive information PI regarding the second pixel P2 having the same right primitive as the first pixel P1. Since a winding number WN corresponding to the primitive mask PM of the first pixel P2, which is '00010', is stored in the winding number memory 111 (e.g., saved to a cache), the winding number generator 110 may generate the winding number WN corresponding to the second pixel P2 by reading out the winding number WN from the winding number memory 111 without calculating a winding number WN.

Similarly, in cases of the third pixel P3 and the fourth pixel P4, the winding number generator 110 may generate a winding number WN corresponding to the third pixel P3 via a calculation and store the calculated winding number WN and a primitive mask PM in the winding number memory 111 so as to correspond to each other. The winding number generator 110 may read out a winding number WN corresponding to the fourth pixel P4 received thereafter from the winding number memory 111 without calculating a winding number WN, thereby generating the winding number WN corresponding to the fourth pixel P4.

Similarly, in cases of the fifth pixel P5 and the sixth pixel P6, the winding number generator 110 may generate a winding number WN corresponding to the fifth pixel P5 via a calculation and store the calculated winding number WN and a primitive mask PM in the winding number memory 111 so as to correspond to each other. The winding number generator 110 may read out a winding number WN corresponding to the sixth pixel P6 received thereafter from the winding number memory 111 without calculating a winding number WN, thereby generating the winding number WN corresponding to the sixth pixel P6.

FIG. 7 is a table for describing an operation of a winding number generator according to an example embodiment.

Referring to FIG. 1 and FIG. 7, in a first example (a), the winding number generator 110 may generate '00010' as a first primitive mask (PM1). The winding number generator 110 may check whether a winding number WN corresponding to '00010' is stored in the winding number memory 111. Since a first winding number WN WN1 corresponding to '00010' is stored as '+1' in the winding number memory 111, the winding number generator 110 may read out the first winding number WN WN1 from the winding number memory 111 without a separate calculation, thereby generating the first winding number WN WN1.

In a second example (b), the winding number generator 110 may generate '10000' as a second primitive mask PM2. The winding number generator 110 may check whether a winding number WN corresponding to '10000' is stored in the winding number memory 111. Since a winding number WN corresponding to '10000' is not stored in the winding number memory 111, the winding number generator 110 may calculate a second winding number WN WN2 as '+1' by using a right primitive. The winding number generator 110 may also store the calculated second winding number WN WN2 in the winding number memory 111 so as to correspond to '10000', which is the second primitive mask PM2.

Figure 8:
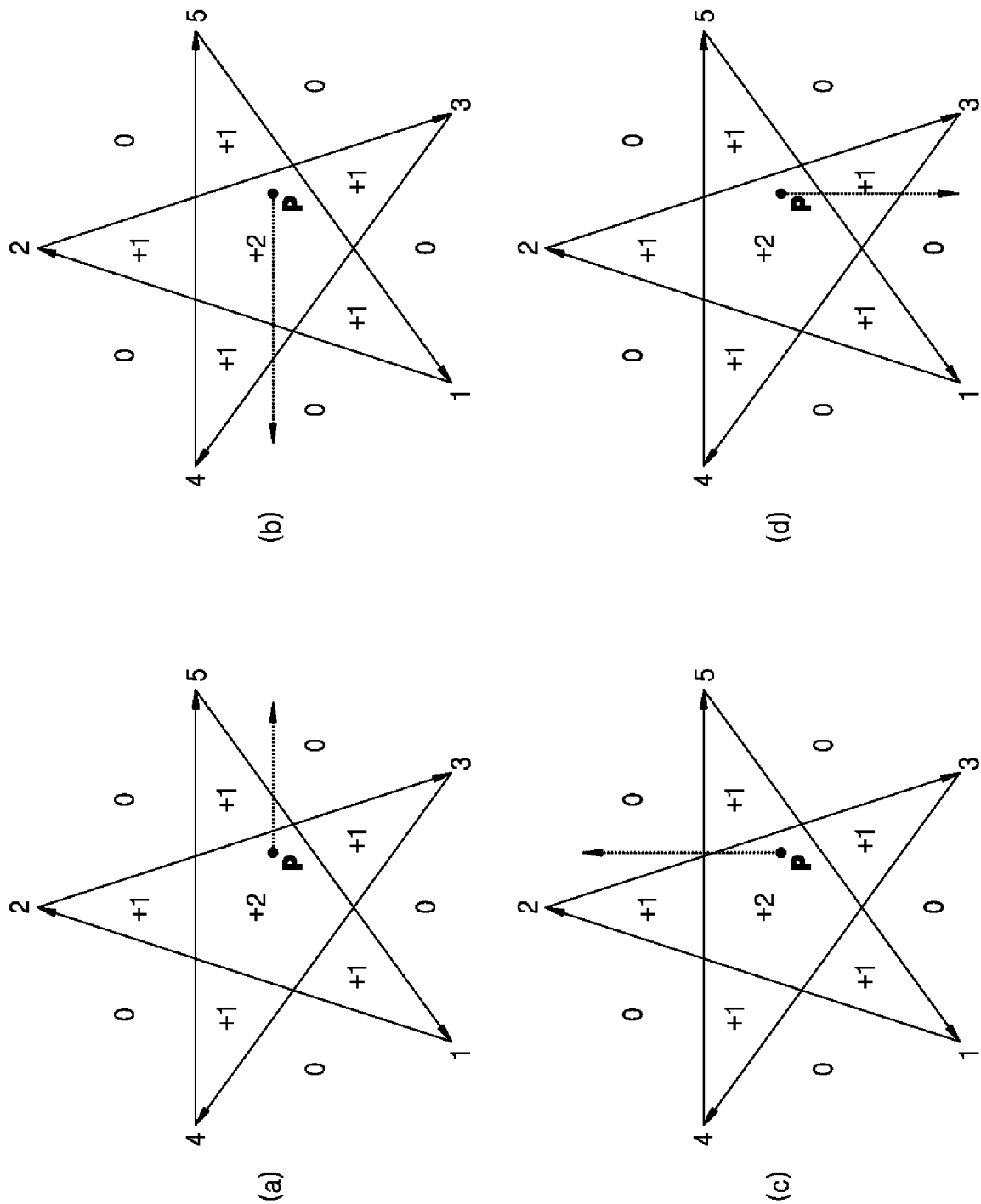
FIG. 8 is a diagram for describing an example in which a winding number generator according to an example embodiment selects different sides to calculate a winding number WN of a pixel.

FIG. 8 is a diagram for describing an example in which a winding number generator according to an example embodiment selects different sides to calculate a winding number WN of a pixel.

Referring to FIGS. 1 and 8, FIGS. 8A through 8D show objects each including vertices 1 through 5. The objects shown in 8A through 8D are the same closed polygons having a star-like shape. Referring to FIG. 8A, the winding number generator 110 may determine whether a path is located on the right side of a pixel P. Specifically, the winding number generator 110 may determine that a path from a vertex 2 to a vertex 3 and a path from a vertex 5 to a vertex 1 exist on the right side of the pixel P (e.g., locations on an imaginary semi-straight line horizontally drawn rightward from the pixel P). Since both a direction in which the path from the vertex 2 to the vertex 3 extends and a direction in which the path from the vertex 5 to the vertex 1 extends are clockwise directions, the winding number generator 110 may calculate a winding number WN of the pixel P as +2.

Referring to FIG. 8B, the winding number generator 110 may determine whether a path is located on the left side of the pixel P. Specifically, the winding number generator 110 may determine that a path from the vertex 1 to a vertex 2 and a path from the vertex 3 to a vertex 4 exist on the left side of the pixel P (e.g., locations on an imaginary semi-straight line horizontally drawn leftward from the pixel P). Since both a direction in which the path from the vertex 1 to the vertex 2 extends and a direction in which the path from the vertex 3 to the vertex 4 extends are clockwise directions, the winding number generator 110 may calculate a winding number WN of the pixel P as +2.

Referring to FIG. 8C, the winding number generator 110 may determine whether a path is located on the upper side of the pixel P. The determination, and other determinations described herein, may be performed, for example by hardware or hardware and software of one or more processors (e.g., a GPU and/or CPU). Specifically, the winding number generator 110 may determine that a path from the vertex 2 to the vertex 3 and a path from the vertex 4 to the vertex 5 exist on the upper side of the pixel P (e.g., locations on an imaginary semi-straight line horizontally drawn upward from the pixel P). Since both a direction in which the path from the vertex 2 to the vertex 3 extends and a direction in which the path from the vertex 4 to the vertex 5 extends are clockwise directions, the winding number generator 110 may calculate a winding number WN of the pixel P as +2.

Referring to FIG. 8D, the winding number generator 110 may determine whether a path is located on the lower side of the pixel P. Specifically, the winding number generator 110 may determine that a path from the vertex 5 to the vertex 1 and a path from the vertex 3 to the vertex 4 exist on the lower side of the pixel P (e.g., locations on an imaginary semi-straight line horizontally drawn downward from the pixel P). Since both a direction in which the path from the vertex 5 to the vertex 1 extends and a direction in which the path from the vertex 3 to the vertex 4 extends are clockwise directions, the winding number generator 110 may calculate a winding number WN of the pixel P as +2.

As described above, even when the winding number generator 110 selects any side around the pixel P and calculates a winding number, results thereof may all be the same. Furthermore, as shown in FIGS. 8A through 8D, winding numbers WNs of pixels existing in a same region from among regions separated by paths may be the same.

Figure 9:
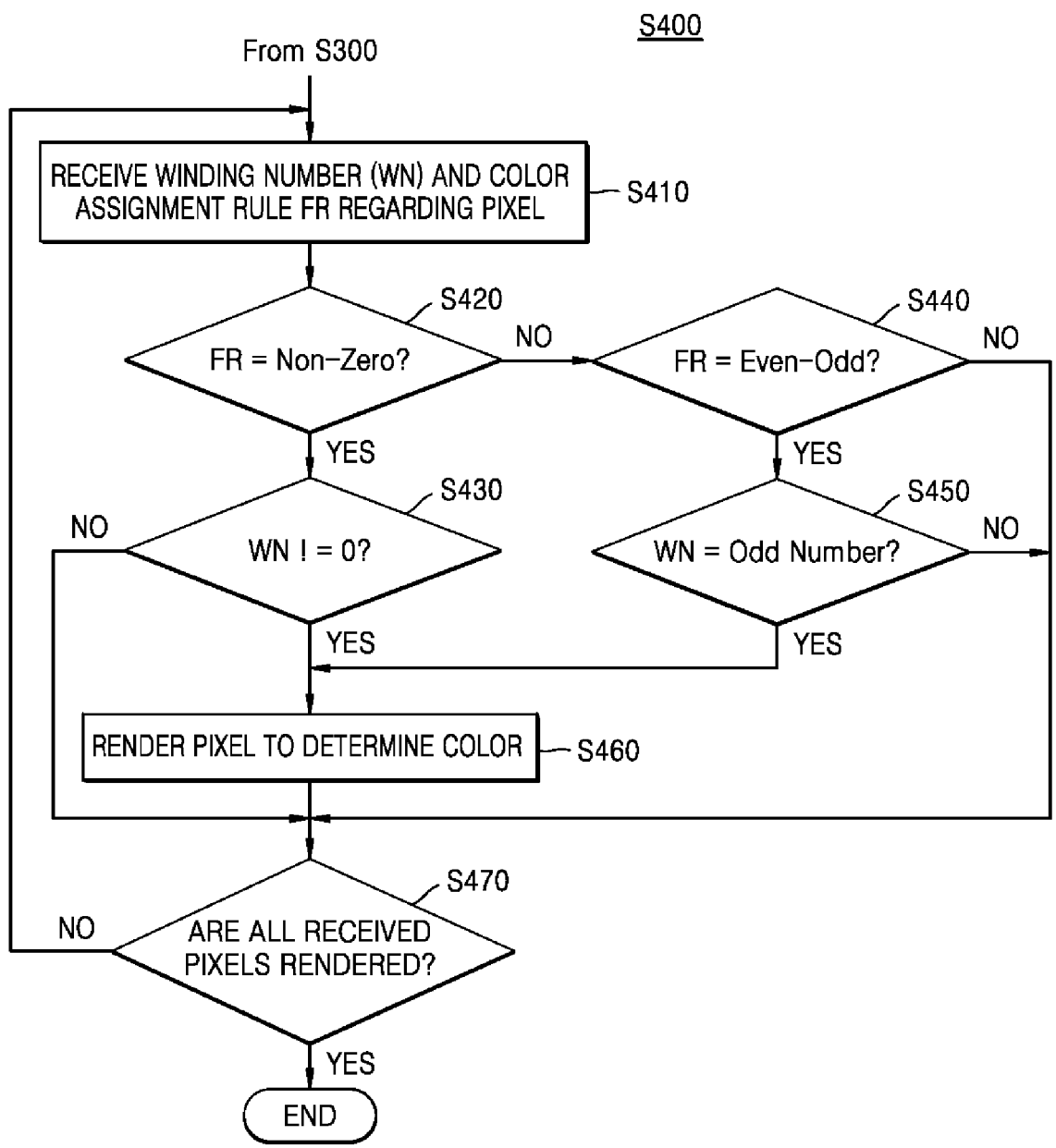
FIG. 9 is a flowchart showing a rendering operation of FIG. 2, according to an example embodiment.

FIG. 9 is a flowchart showing the rendering operation (operation S400) of FIG. 2 according to an example embodiment. In detail, FIG. 9 is a flowchart showing a method of operating a rendering determiner.

Referring to FIGS. 1 and 9, the rendering determiner 120 may receive a winding number WN and a color assignment rule FR corresponding to a pixel (operation S410). The rendering determiner 120 may determine whether the color assignment rule FR is a non-zero rule (operation S420). When the color assignment rule FR is the non-zero rule, it may be determined whether the winding number WN of the pixel is not '0' (operation S430). When the winding number WN of the pixel is not '0', the rendering determiner 120 may render the pixel to a determined color (operation S460). For example, the rendering determiner 120 may receive more information regarding the determined color from an external unit (e.g., CPU) and render the pixel to the determined color. When the winding number WN of the pixel is '0', the rendering determiner 120 may not render the pixel.

When the color assignment rule FR is not the non-zero rule, the rendering determiner 120 may determine whether the color assignment rule FR is an even-odd rule (operation S440). When the color assignment rule FR is the even-odd rule, it may be determined whether the winding number WN of the pixel is an odd number (operation S450). For example, the rendering determiner 120 may determine whether the winding number WN is an odd number by checking whether the remainder of dividing the winding number WN by 2 is 1. When the winding number WN of the pixel is an odd number, the rendering determiner 120 may render the pixel to a determined color (operation S460). For example, the rendering determiner 120 may receive more information regarding the determined color from an external unit (e.g., CPU) and render the pixel to the determined color. When the winding number WN of the pixel is not an odd number (that is, when the winding number WN of the pixel is an even number), the rendering determiner 120 may not render the pixel.

When the color assignment rule FR is not the even-odd rule (operation S440), when the color assignment rule FR is the non-zero rule and the winding number WN is zero (operation S430), or when the color assignment rule FR is the even-odd rule and the winding number WN is not an odd number (operation S450), the rendering determiner 120 may determine whether all of pixels received from the winding number generator 110 are rendered (operation S470). When not all of the pixels received from the winding number generator 110 are rendered, the rendering determiner 120 may render the pixels by repeating the operations S410 through S460. When all of the pixels received from the winding number generator 110 are rendered, the rendering determiner 120 may terminate rendering.

Figure 10:
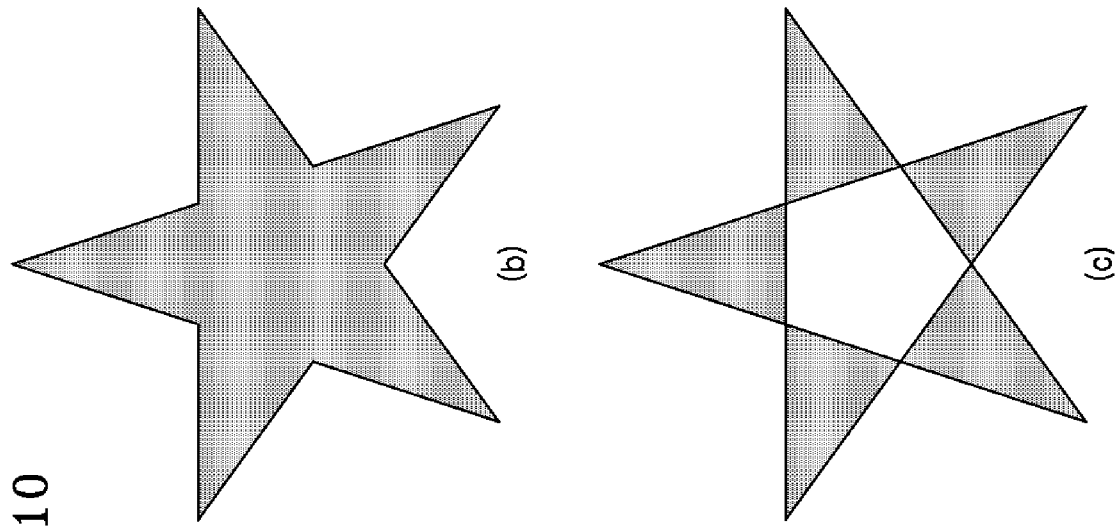
FIG. 10 is a diagram for describing an example in which a rendering determiner according to an example embodiment determines whether to set a color to each of pixels.
Figure 10:
Figure 10:
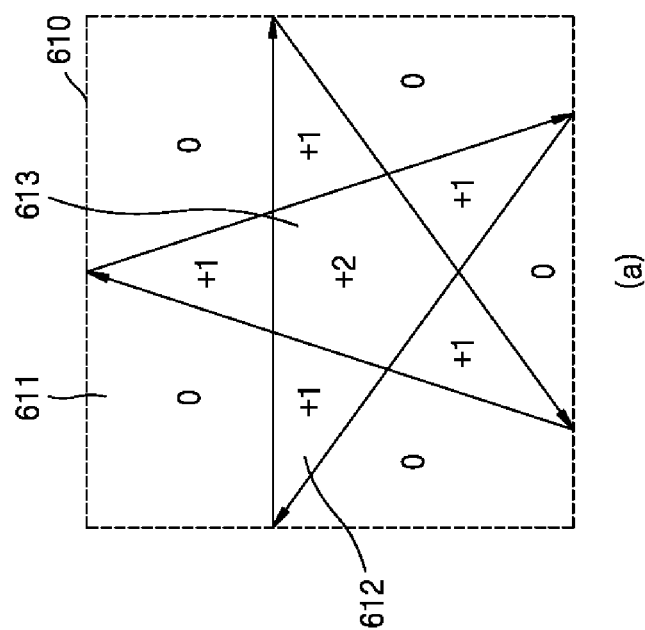

FIG. 10 is a diagram for describing an example in which a rendering determiner according to an example embodiment determines whether to set a color to each of a plurality of pixels.

Referring to FIGS. 1 and 10, FIG. 10(*a*) shows a result in which the winding number generator 110 calculates respective winding numbers WN corresponding to pixels included in a frame 610 and FIG. 10(*b*) shows a result of assigning color values to the respective pixels according to a non-zero rule. Furthermore, FIG. 10(*c*) shows a result of assigning color values to the respective pixels according to an even-odd rule.

Referring to FIG. 10(*a*), a winding number WN for each of the pixels included in the frame 610 may be calculated as shown in FIG. 10(*a*). Specifically, the winding number WN of each of pixels included in a first region 611 may be calculated as 0, the winding number WN of each of pixels included in a second region 612 may be calculated as +1, and the winding number WN of each of pixels included in a third region 613 may be calculated as +2.

For example, the rendering determiner 120 may determine whether to set a color to each of pixels based on a non-zero rule. Here, the non-zero rule may refer to a rule for assigning color values to pixels corresponding to winding numbers WNs that are not zero. Referring to FIG. 10(*b*), in a case of complying with the non-zero rule, the rendering determiner 120 may determine to set colors to the pixels included in the second region 612 and the third region 613 shown in FIG. 10(*a*) and to not to set colors to the pixels included in the first region 611.

In another example, the rendering determiner 120 may determine whether to set a color to each of pixels based on an even-odd rule. Here, the even-odd rule may refer to a rule for assigning color values to pixels corresponding to odd winding numbers WN. Here, the odd winding numbers WN may refer to winding numbers WN of pixels with odd absolute values. For example, when a winding number WN is +3, it may be determined as an odd winding number WN and, when a winding number WN is −3, it may also be determined as an odd winding number WN. Referring to FIG. 10(*c*), according to the even-odd rule, the rendering determiner 120 may determine to set colors to the pixels included in the second region 612 shown in FIG. 10(*a*) and to not to set colors to the pixels included in the first region 611 and the third region 613.

According to an example embodiment, the rendering determiner 120 may further receive information regarding determined colors from an external unit (e.g., CPU), and the rendering determiner 120 may assign values corresponding to the determined colors. According to another example embodiment, the rendering determiner 120 may transmit information regarding pixels, which are determined to set colors to, to a pixel shader, and the pixel shader may determine pre-set colors values to the pixels determined by the rendering determiner 120 to assign colors to.

Figure 11:
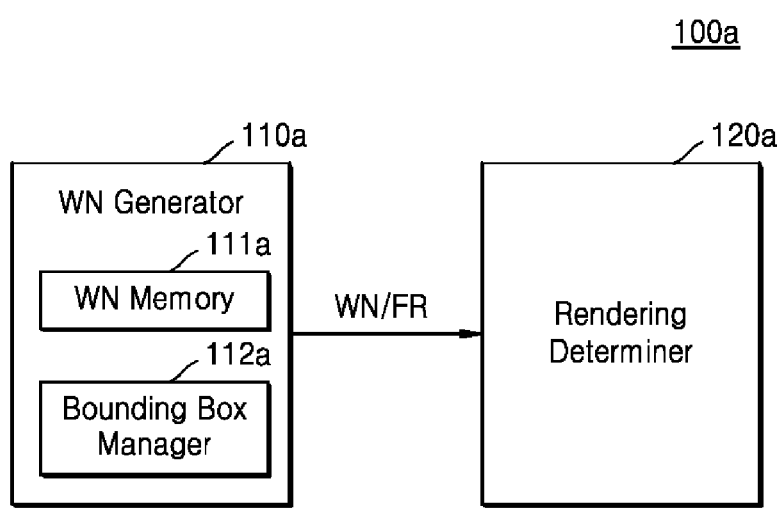
FIG. 11 is a block diagram of a graphics processing unit according to an example embodiment.

FIG. 11 is a block diagram of a graphics processing unit according to an example embodiment. Descriptions already given above with reference to FIG. 1 will be omitted below.

Referring to FIG. 11, a graphics processing unit 100a may include a winding number generator 110a and a rendering determiner 120a. The winding number generator 110a may include a winding number memory 111a and a bounding box manager 112a. The winding number memory 111a and the rendering determiner 120a may be identical or similar to the winding number memory 111 and the rendering determiner 120 of FIG. 1, respectively. Therefore, detailed description thereof will be omitted.

The bounding box manager 112a may set a bounding box in a frame by using coordinate components of each of a plurality of vertices. For example, the bounding box manager 112a may set a bounding box in a frame by using the largest value and the smallest value of horizontal direction coordinate ingredients and the largest value and the smallest value of vertical direction coordinate ingredients from among coordinate ingredients of the vertices. Furthermore, the winding number generator 110a may calculate a winding number WN for each of the pixels included in the bounding box set by the bounding box manager 112a.

Although the bounding box manager 112a is shown as a component of the graphics processing unit 100a in FIG. 11, according to another example embodiment, the bounding box manager 112a may be included in a device outside the graphics processing unit 100a (e.g., a CPU). In the present embodiment, the graphics processing unit 100a may receive only information regarding pixels located in the bounding box and perform rendering based on the information.

Figure 12:
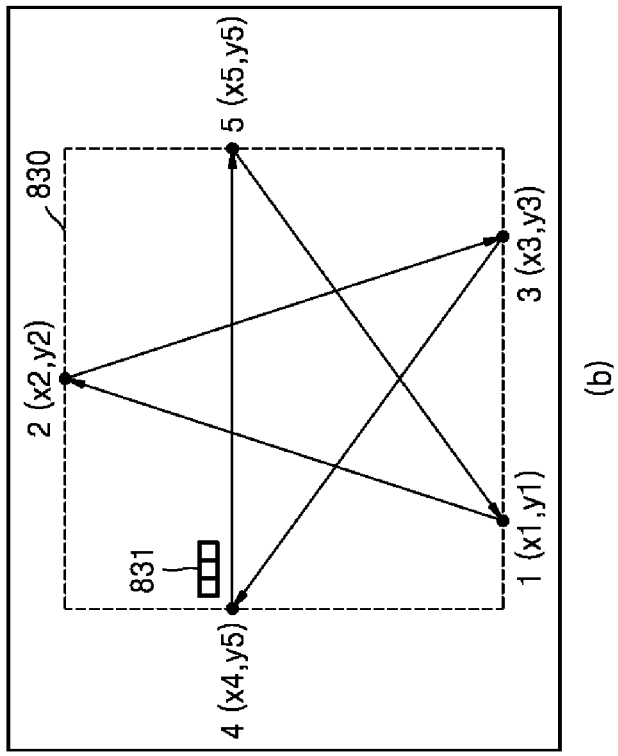
FIG. 12 is a diagram showing an example of operations of a bounding box manager, according to an example embodiment.
Figure 12:
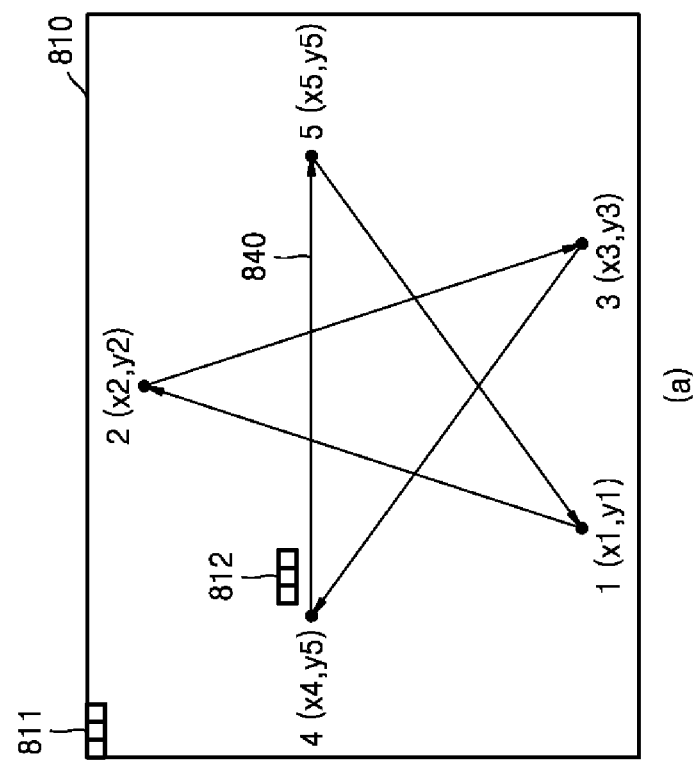

FIG. 12 is a diagram showing an example of operations of a bounding box manager, according to an example embodiment. In detail, FIG. 12 is a diagram showing an example in which the bounding box manager 112a sets up a bounding box.

Referring to FIGS. 11 and 12, FIG. 12(*a*) shows an object 840 included in a frame 810 (e.g., the frame may be a video frame or an image frame for display on a screen). The object 840 is star-shaped. The winding number generator 110a may calculate a winding number WN corresponding to each of a plurality of pixels included in the frame 810. Therefore, when the object 840 occupies a small area in the frame 810, even when the winding number generator 110a does not calculate winding numbers WN for all of the pixels included in the frame 810, path rendering may be performed. For example, the winding number generator 110a may obtain the same result by calculating winding numbers WN corresponding to pixels 812 close to the object 840 without calculating winding numbers WN corresponding to pixels 11 far from the object 840 as it would by calculating winding numbers WN corresponding to all pixels in the frame. This can improve the processing speed overall.

Referring to FIG. 12(*b*), the bounding box manager 112a may set a bounding box 830 in the frame 810. The winding number generator 110a may calculate a winding number WN only for pixels 831 located inside the bounding box 830. At this time, the bounding box manager 112a may set the bounding box 830 by using the coordinate (x1, y1) of a vertex 1, the coordinate (x2, y2) of a vertex 2, the coordinate (x3, y3) of a vertex 3, the coordinate (x4, y4) of a vertex 4, and the coordinate (x5, y5) of a vertex 5 included in the object 840.

For example, the bounding box manager 112a may set a bounding box in a frame by using the largest value and the smallest value of horizontal direction coordinate ingredients and the largest value and the smallest value of vertical direction coordinate ingredients from among the coordinate (x1, y1) of the vertex 1, the coordinate (x2, y2) of the vertex 2, the coordinate (x3, y3) of the vertex 3, the coordinate (x4, y4) of the vertex 4, and the coordinate (x5, y5) of the vertex 5. First, the bounding box manager 112a may select the largest value (x5) and the smallest value (x4) from among the x coordinate ingredients (x1, x2, x3, x4, and x5) of the vertices. Furthermore, the bounding box manager 112a may select the largest value (y2) and the smallest value (y1 or y3) from among the y coordinate ingredients (y1, y2, y3, y4, and y5) of the vertices. The bounding box manager 112a may set a first coordinate (x5, y2) by using the largest value of the x coordinate ingredients and the largest value of the y coordinate ingredients. Furthermore, the bounding box manager 112a may set a second coordinate (x4, y1) by using the smallest value of the x coordinate ingredients and the smallest value of the y coordinate ingredients. The bounding box manager 112a may set a rectangle having a diagonal line interconnecting the first coordinate (x5, y2) and the second coordinate (x4, y1) as the bounding box 830.

As described above, the bounding box manager 112a may set a bounding box including the least pixels for performing a path rendering, and thus the winding number generator 110a may calculate only winding numbers WN corresponding to the least number of pixels. Therefore, the graphics processing unit 100a may perform a path rendering more quickly.

Figure 13:
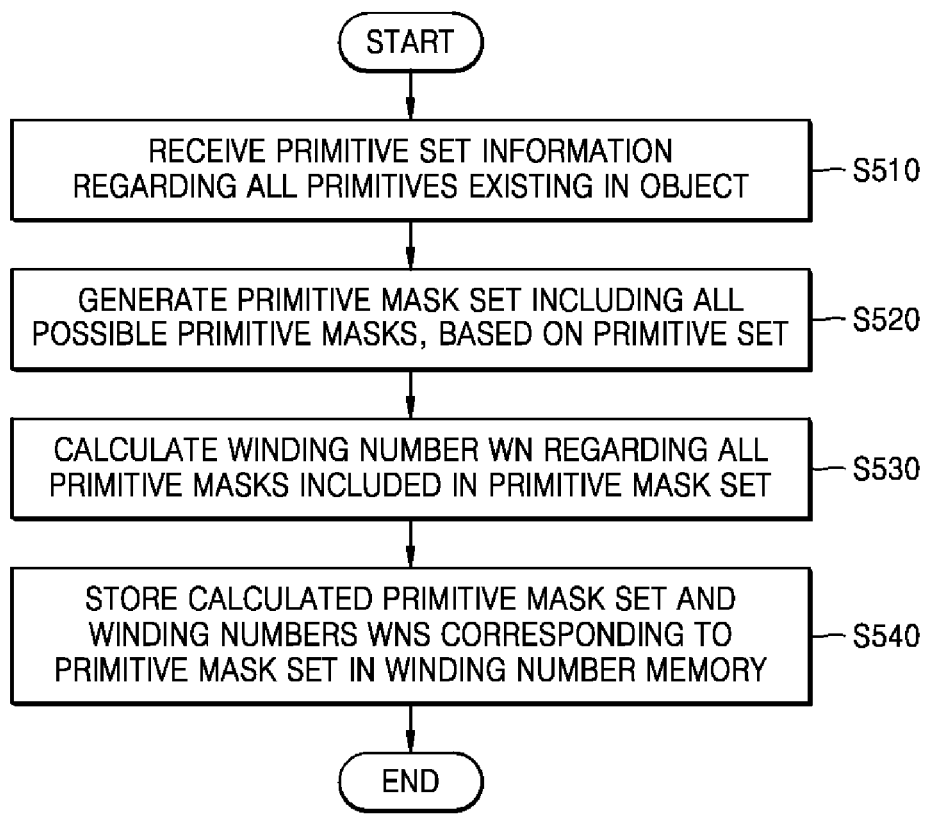
FIG. 13 is a flowchart of a method of operating a graphics processing unit, according to an example embodiment.

FIG. 13 is a flowchart of a method of operating a graphics processing unit according to an example embodiment.

Referring to FIGS. 1 and 13, the graphics processing unit 100 may receive primitive set information, which is information regarding all primitives existing in an object (operation S510). The graphics processing unit 100 may generate a primitive mask set, which is a set of all primitive masks that may be generated based on a primitive set (operation S520). The graphics processing unit 100 may calculate winding numbers WN for all of primitive masks PM included in the primitive mask set (operation S530). The graphics processing unit 100 may store the primitive mask set and the winding numbers WN corresponding to the primitive mask set in the winding number memory 111 (operation S540).

Unlike in the embodiment of FIG. 1, according to the present embodiment, a winding number WN corresponding to all possible primitive masks PM are calculated instead of calculating winding numbers WN corresponding to individual pixels and stored in the winding number memory 111, and thus the graphics processing unit 100 may directly read the primitive mask PM corresponding to a received pixel without checking whether the primitive mask PM is stored in the winding number memory 111.

Figure 14:
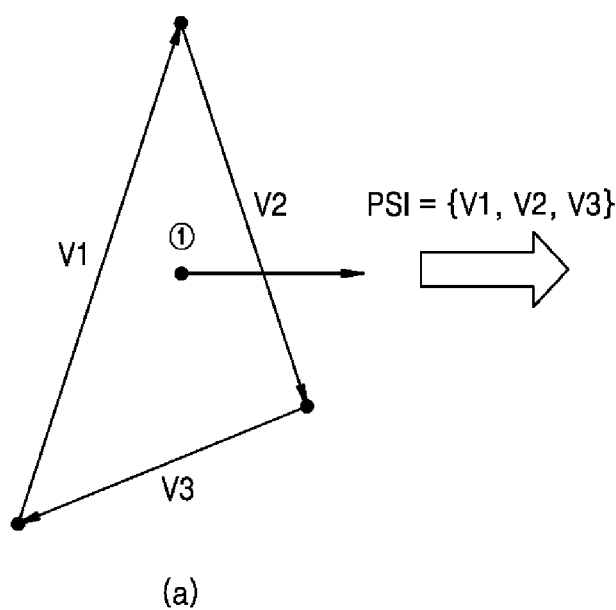
FIG. 14 is a diagram showing a method of operating a graphics processing unit, according to an example embodiment.

FIG. 14 is a diagram showing a method of operating a graphics processing unit according to an example embodiment. In detail, FIG. 14 shows an example of a method of operating the graphics processing unit according to the embodiment of FIG. 13.

Referring to FIGS. 1 and 14, the graphics processing unit 100 may receive primitive set information PSI {V1, V2, V3} in order to render a primitive as shown in FIG. 14A. In response thereto, the graphics processing unit 100 may generate a primitive mask set by generating all possible primitive masks PM. In the example shown in FIG. 14, since the number of primitives is 3, the number of primitive masks PM may be 2*2*2=8. Therefore, eight primitive masks PM '001' through '111' may be generated as shown in FIG. 14B.

The graphics processing unit 100 may calculate a winding number WN for all of the primitive masks PM included in the primitive mask set. In the example (1), when the primitive mask PM is '010', it may indicate that only the second primitive V2 exists as a right primitive. When an imaginary semi-straight line meets the second primitive V2 only, the second primitive V2 extends in a clockwise direction from an origin at the intersection of the imaginary semi-straight line and the second primitive V2, the winding number WN may be calculated as '+1'.

In the example (2), when the primitive mask PM is '110', it may indicate that the second primitive V2 and the third primitive V3 exist simultaneously as right primitives. However, since one imaginary semi-straight line extending rightward does not meet both the second primitive V2 and the third primitive V3 at once, no winding number WN may be stored or 'NULL' may be stored.

A winding number WN corresponding to all of the primitive masks PM may be generated in the above-described manner, and a primitive mask set including all of the primitive masks PM and a winding number WN corresponding thereto may be stored in the winding number memory 111 so as to correspond to each other. According to an example embodiment, winding numbers WN, which may not be calculated, like 'X' shown in FIG. 14B may not be stored in the winding number memory 111.

Figure 15:
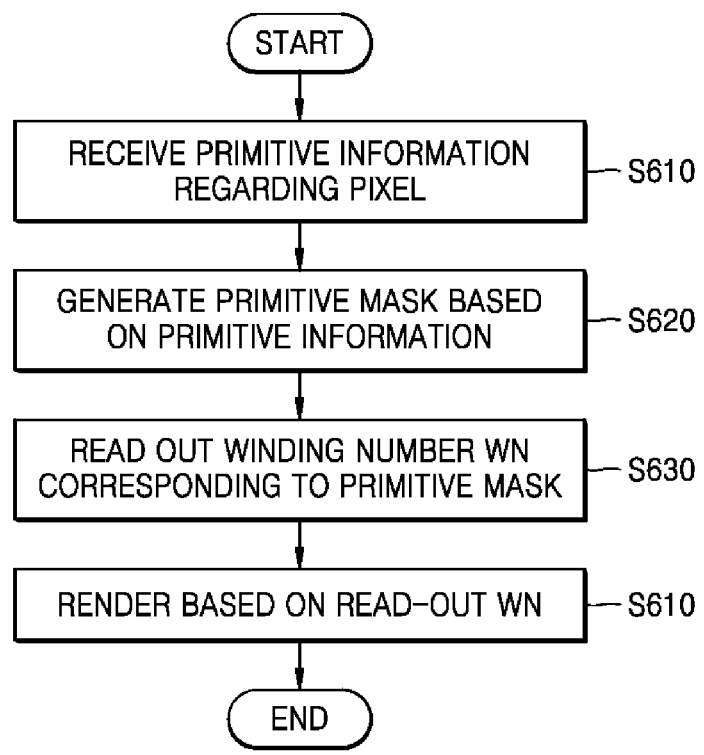
FIG. 15 is a flowchart of a method of operating a graphics processing unit, according to an example embodiment.

FIG. 15 is a flowchart of a method of operating a graphics processing unit according to an example embodiment. In detail, FIG. 15 is a flowchart of a method of operating a graphics processing unit when primitive information regarding a pixel is received after a primitive set and a winding number WN corresponding thereto are stored according to the embodiment of FIG. 13.

Referring to FIGS. 1 and 15, the graphics processing unit 100 may receive primitive information PI regarding a pixel (operation S610). The graphics processing unit 100 may generate a primitive mask based on the primitive information PI (operation S620). The graphics processing unit 100 may read a winding number WN corresponding to a primitive mask generated from the winding number memory 111 (operation S630). The graphics processing unit 100 may perform rendering based on the read winding number WN (operation S640).

As described above with reference to FIG. 13, all primitive masks and winding numbers WNs corresponding thereto may be stored in the winding number memory 111, unlike in the embodiment of FIG. 1. Therefore, the graphics processing unit 100 may read a winding number WN corresponding to the primitive mask without checking whether a primitive mask corresponding to received primitive information PI is stored in the winding number memory 111.

Figure 16:
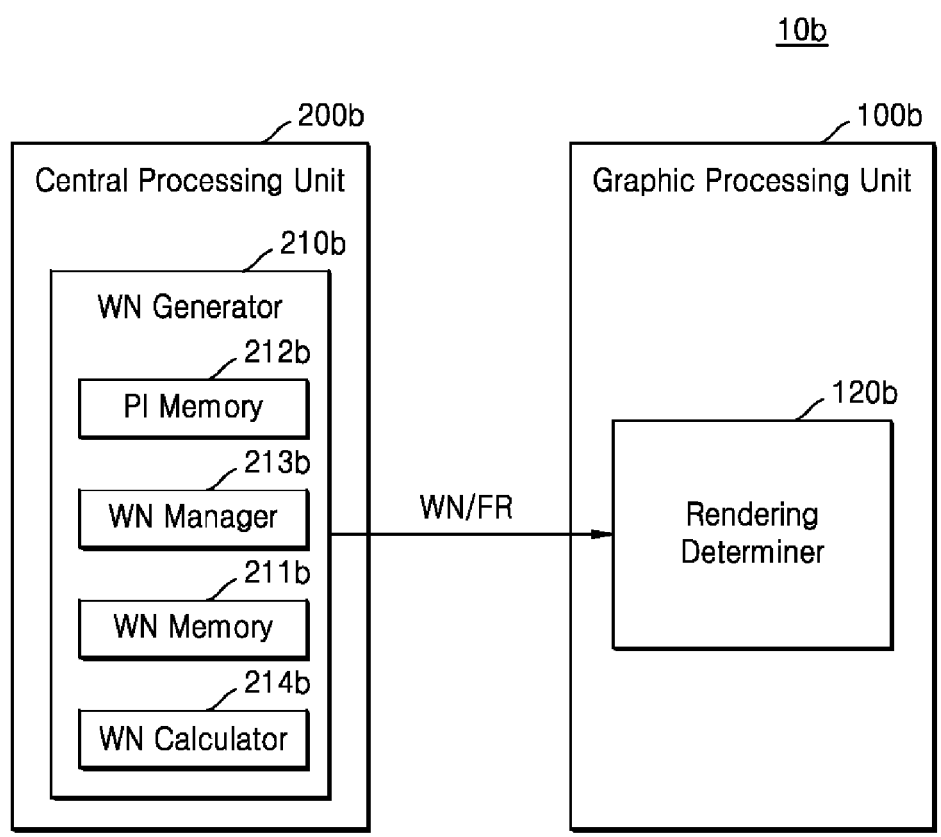
FIG. 16 is a diagram showing a graphics processing system according to an example embodiment.

FIG. 16 is a diagram showing a graphics processing system according to an example embodiment.

Referring to FIG. 16, a graphics processing system 10b may include a central processing unit (CPU) 200b and a graphics processing unit 100b. The graphics processing system may be connected to a display screen having a plurality of pixels. The CPU 200b may include a winding number generator 210b, and the graphics processing unit 100b may include a rendering determiner 120b. The winding number generator 210b may also include a winding number memory 211b, a primitive information memory 212b, a winding number manager 213b, and a winding number calculator 214b.

Unlike the embodiment of FIG. 1, the embodiment of FIG. 16 is an embodiment in which the winding number generator 210b is included in the CPU 200b instead of the graphics processing unit 100b. Therefore, operations performed by respective functional blocks may be identical or similar to those in the embodiment of FIG. 1. In general, one or more processors (e.g., the GPU alone, or the GPU combined with a CPU) may include a winding number generator and rendering determiner, which may each be implemented using hardware or a combination of hardware and software.

In one embodiment, the winding number generator 210b is included in the CPU 200b, generates a winding number WN and a color assignment rule FR based on object information, and outputs the winding number WN and the color assignment rule FR to the rendering determiner 120b. Therefore, the winding number manager 213b may receive primitive information from the primitive information memory 212b and generate a primitive mask based on the primitive information. The winding number manager 213b may check whether a winding number WN corresponding to the primitive mask is stored in the winding number memory 211b included in the CPU 200b. Furthermore, the winding number manager 213b may generate winding numbers WN in different manners based on checking results and output the winding numbers WN to the rendering determiner 120b. The rendering determiner 120b may perform rendering based on the received winding numbers WN.

Unlike in the embodiment of FIG. 16, the inventive concept may be applied to an embodiment in which at least one of the winding number memory 211b, the primitive information memory 212b, the winding number manager 213b, and the winding number calculator 214b is included in the graphics processing unit 100b.

According to an example embodiment, the primitive information memory 212b may be included in the CPU 200b, and the winding number memory 211b, the winding number manager 213b, and the winding number calculator 214b may be included in the graphics processing unit 100b. According to the present embodiment, the winding number manager 213b may receive primitive information from the CPU 200b and perform rendering based on the primitive information.

According to an example embodiment, the winding number manager 213b may be included in the CPU 200b, and the winding number memory 211b, the primitive information memory 212b, and the winding number calculator 214b may be included in the graphics processing unit 100b. According to another example embodiment, the primitive information memory 212b and the winding number manager 213b may be included in the CPU 200b, and the winding number memory 211b and the winding number calculator 214b may be included in the graphics processing unit 100b. According to the present embodiment, the CPU 200b may directly generate a primitive mask and determine whether a winding number WN corresponding to the generated primitive mask is stored in the winding number memory 211b included in the graphics processing unit 100b. Depending on whether the winding number WN corresponding to the generated primitive mask is stored in the winding number memory 211b, the CPU 200b may perform rendering by outputting a read command to the winding number memory 211b or outputting a calculate command to the winding number calculator 214b.

According to an example embodiment, the primitive information memory 212b, the winding number manager 213b and the winding number calculator 214b may be included in the CPU 200b and the winding number memory 211b may be located in the graphics processing unit 100b. According to this embodiment, the CPU 200b may generate a primitive mask based on primitive information and determine whether a winding number WN corresponding to the primitive mask is stored in a winding number memory 211b included in the graphics processing unit 100b. When the winding number WN corresponding to the primitive mask is stored in a winding number memory 211b, the CPU 200b may perform rendering by outputting a read command to the winding number memory 211b. When the winding number WN corresponding to the primitive mask is not stored in a winding number memory 211b, the CPU 200b may perform rendering by calculating a winding number WN and outputting the calculated winding number WN to the rendering determiner 120b.

According to an example embodiment, at least one of the primitive information memory 212b and the winding number memory 211b may exist as an external memory located outside the CPU 200b and the graphics processing unit 100b. According to the present embodiment, the graphics processing unit 100b may check whether a primitive mask generated based on primitive information is stored in the winding number memory 211b existing outside the graphics processing unit 100b. When the primitive mask is stored in the winding number memory 211b existing outside the graphics processing unit 100b, the graphics processing unit 100b may perform rendering by outputting a read command to the winding number memory 211b. When the primitive mask is not stored in the winding number memory 211b existing outside the graphics processing unit 100b, the graphics processing unit 100b may perform rendering by calculating a winding number WN and outputting the calculated winding number WN to the rendering determiner 120b.

As discussed previously, by using the method described above with regard to primitive information, winding numbers, and pixel rendering, in addition to the other features discussed above, the processing speed of a GPU and/or CPU can be improved, thereby speeding up the display of images on a screen.

While the inventive concept has been particularly shown and described with reference to embodiments thereof, it will be understood that various changes in form and details may be made therein without departing from the spirit and scope of the following claims.

What is claimed is:

1. A graphics processing unit, which generates winding numbers in different manners depending on primitive information, the graphics processing unit comprising:
   a winding number generator configured to receive object information including primitive information regarding an object, the winding number generator including a first memory for storing a winding number corresponding to the primitive information; and
   a rendering determiner configured to perform rendering based on the winding number,
   wherein the winding number generator generates winding numbers respectively corresponding to a plurality of pixels in different manners based on a determination of whether the winding number corresponding to the primitive information is stored in the first memory,
   wherein the first memory stores a primitive mask, the primitive mask corresponding to the primitive information and comprising a plurality of bits, and stores a winding number corresponding to the primitive mask, and
   the winding number generator comprises:
      a winding number manager configured to check whether the winding number corresponding to the primitive mask is stored in the first memory; and
      a winding number calculator configured to calculate, based on the primitive information, the winding number corresponding to the primitive mask.

2. The graphics processing unit of claim 1, wherein the winding number manager generates, based on the primitive information, a primitive mask comprising a plurality of bits.

3. The graphics processing unit of claim 1, wherein, when the winding number corresponding to the primitive mask is stored in the first memory, the winding number manager outputs a signal for reading out the winding number corresponding to the primitive mask from the first memory.

4. The graphics processing unit of claim 1, wherein, when the winding number corresponding to the primitive mask is not stored in the first memory, the winding number manager outputs the primitive information to the winding number calculator.

5. The graphics processing unit of claim 1, wherein the object information further comprises a color assignment rule including information regarding a rule for assigning colors according to winding numbers, and
   the rendering determiner performs rendering based on the winding numbers and the color assignment rule.

6. The graphics processing unit of claim 5, wherein the color assignment rule comprises an even-odd rule or a non-zero rule, and,
   when the color assignment rule comprises the even-odd rule, the rendering determiner outputs, with respect to the plurality of pixels, colors respectively to pixels having odd winding numbers and does not output a color to pixels with even winding numbers, and,
   when the color assignment rule comprises the non-zero rule, the rendering determiner outputs, with respect to the plurality of pixels, colors respectively to pixels having winding numbers that are not 0 and does not output a color to pixels having winding numbers that are 0.

7. The graphics processing unit of claim 1, wherein the winding number generator further comprises a second memory configured to store the primitive information, and
   the winding number generator reads out the primitive information from the second memory.

8. A graphics processing method of rendering an object, the graphics processing method comprising:
   receiving, by one or more processors, object information including primitive information regarding the object;
   generating, by the one or more processors a primitive mask with respect to respective pixels, the primitive mask corresponding to the primitive information and comprising a plurality of bits;
   generating, by the one or more processors, and based on the primitive mask, winding numbers with respect to the respective pixels; and
   rendering the pixels, based on the winding numbers,
   wherein generating the winding numbers comprises checking, by the one or more processors, whether winding numbers corresponding to the primitive mask are stored in a first memory and generating the winding numbers in different manners based on whether the winding numbers corresponding to the primitive mask are stored in the first memory.

9. The graphics processing method of claim 8, wherein the one or more processors includes a graphics processing unit (GPU) and a central processing unit (CPU).

10. The graphics processing method of claim 8, wherein generating the winding numbers further comprises, when the winding numbers corresponding to the primitive mask are stored in the first memory, reading out stored winding numbers.

11. The graphics processing method of claim 8, wherein generating the winding numbers further comprises, when the winding numbers corresponding to the primitive mask are not stored in the first memory, calculating the winding numbers corresponding to the primitive mask based on the primitive information.

12. The graphics processing method of claim 11, further comprising storing, in the first memory, the winding numbers calculated in the calculating of the winding numbers, so as to correspond to the primitive mask.

13. The graphics processing method of claim 8, wherein the receiving comprises receiving primitive set information which is information regarding all primitives existing in the object, and the method further comprises:
generating, by the one or more processors and based on the primitive set information, a primitive mask set which is a set of all possible primitive masks;
calculating by the one or more processors winding numbers regarding all of the primitive masks included in the primitive mask set; and
storing the winding numbers in a cache memory so as to correspond to the primitive mask set.

14. The graphics processing method of claim 8, further comprising setting a bounding box to be rendered,
wherein, in the receiving, primitive information regarding pixels existing in the bounding box is received.

15. The graphics processing method of claim 8, wherein the object information further comprises a color assignment rule including information regarding a rule for assigning colors according to the winding numbers, and,
in the rendering, the pixels are rendered based on the winding numbers generated by the one or more processors and the color assignment rule.

16. The graphics processing method of claim 15, wherein the color assignment rule comprises an even-odd rule or a non-zero rule, wherein,
in the rendering, when the color assignment rule comprises the even-odd rule, a color is set to a pixel with an odd winding number and no color is set to a pixel with an even winding number, and,
in the rendering, when the color assignment rule comprises the non-zero rule, a color is set to a pixel of which a corresponding winding number is not 0, and no color is set to a pixel of which a corresponding a winding number is 0.

17. The graphics processing method of claim 8, further comprising:
storing the primitive information in a second memory; and
reading out the primitive information from the second memory.

* * * * *